United States Patent
Hadi

(10) Patent No.: US 11,364,762 B2
(45) Date of Patent: Jun. 21, 2022

(54) SUSPENSION HAVING ELECTRICALLY-CONTROLLABLE MATERIAL

(71) Applicant: DRiV Automotive Inc., Lake Forest, IL (US)

(72) Inventor: Rod Hadi, Grass Lake, MI (US)

(73) Assignee: DRiV Automotive Inc., Lake Forest, IL (US)

( * ) Notice: Subject to any disclaimer, the term of this patent is extended or adjusted under 35 U.S.C. 154(b) by 13 days.

(21) Appl. No.: 16/777,166

(22) Filed: Jan. 30, 2020

(65) Prior Publication Data

US 2020/0238781 A1 Jul. 30, 2020

Related U.S. Application Data

(60) Provisional application No. 62/804,431, filed on Feb. 21, 2019, provisional application No. 62/798,616, filed on Jan. 30, 2019, provisional application No. 62/798,632, filed on Jan. 30, 2019.

(51) Int. Cl.
| | |
|---|---|
| *B60G 17/015* | (2006.01) |
| *B60N 2/02* | (2006.01) |
| *B60G 3/04* | (2006.01) |
| *B60G 17/016* | (2006.01) |
| *B62D 33/04* | (2006.01) |

(52) U.S. Cl.
CPC ........... *B60G 17/0152* (2013.01); *B60G 3/04* (2013.01); *B60G 17/016* (2013.01); *B60N 2/0224* (2013.01); *B62D 33/04* (2013.01)

(58) Field of Classification Search
CPC .... B60G 17/016; B60G 3/04; B60G 17/0152; F16F 1/3615
See application file for complete search history.

(56) References Cited

U.S. PATENT DOCUMENTS 5,068,018 A * 11/1991 Carlson .................. G05B 19/02
204/554
5,454,451 A * 10/1995 Kawamata ......... B60G 17/0152
188/267.1

(Continued)

FOREIGN PATENT DOCUMENTS

| CN | 104627031 | 6/2017 |
|---|---|---|
| CN | 108488291 | 9/2018 |

(Continued)

OTHER PUBLICATIONS

International Search Report for International Application PCT/US2020/015859, dated May 20, 2020.

*Primary Examiner* — Paul N Dickson
*Assistant Examiner* — Maxwell L Meshaka
(74) *Attorney, Agent, or Firm* — Burris Law, PLLC

(57) ABSTRACT

A vehicle load-bearing member includes an electro-active material, a lead wire for delivering an electric current to the electro-active material, and a controller in communication with a power supply for supplying electric current to the electro-active material for changing dynamic characteristics of the electro-active material, wherein changing dynamic characteristics of the electro-active material changes at least one of dampening and stiffness of the vehicle load-bearing member by changing the shape of the electro-active material.

19 Claims, 9 Drawing Sheets

(56) References Cited

U.S. PATENT DOCUMENTS

| | | | | |
|---|---|---|---|---|
| 6,286,895 B1* | 9/2001 | Urushiyama | ............ | B60R 19/00 |
| | | | | 188/371 |
| 6,491,291 B1* | 12/2002 | Keeney | ................ | B60G 15/00 |
| | | | | 188/276 |
| 6,688,618 B2* | 2/2004 | Schmidt | ................ | B60G 7/006 |
| | | | | 280/124.108 |
| 7,252,313 B2* | 8/2007 | Browne | ................ | B29C 33/308 |
| | | | | 293/128 |
| 7,284,786 B2* | 10/2007 | Browne | ..................... | B60J 7/04 |
| | | | | 296/107.01 |
| 7,703,839 B2* | 4/2010 | McKnight | ............ | B60K 11/085 |
| | | | | 296/180.5 |
| 7,950,488 B2* | 5/2011 | Browne | ................ | B60R 21/38 |
| | | | | 180/274 |
| 8,313,108 B2* | 11/2012 | Ac | ........................ | F16F 7/082 |
| | | | | 280/5.5 |
| 8,668,215 B2* | 3/2014 | Juriga | ................ | B60G 17/023 |
| | | | | 280/124.174 |
| 8,727,362 B2 | 5/2014 | Heimann et al. | | |
| 8,745,977 B2 | 6/2014 | Spieth | | |
| 8,857,801 B2* | 10/2014 | Yoshioka | ............. | B29C 70/085 |
| | | | | 267/149 |
| 8,882,120 B2* | 11/2014 | Juriga | ................ | B60G 17/0275 |
| | | | | 280/124.174 |
| 9,527,421 B2 | 12/2016 | Hulway | | |
| 9,657,799 B2 | 5/2017 | Spiegel et al. | | |
| 9,845,029 B1 | 12/2017 | Dry et al. | | |
| 11,189,779 B2* | 11/2021 | Hilgers | ................ | H01L 41/0986 |
| 2011/0031668 A1* | 2/2011 | Schlittler | ............. | F16F 1/3615 |
| | | | | 267/182 |
| 2014/0095024 A1* | 4/2014 | Hirao | ................... | B60G 17/016 |
| | | | | 701/37 |
| 2015/0183286 A1* | 7/2015 | Bruehl | ..................... | B62D 3/02 |
| | | | | 280/124.135 |
| 2016/0297337 A1 | 10/2016 | White et al. | | |
| 2017/0254383 A1* | 9/2017 | Orita | ..................... | B81B 3/007 |
| 2018/0222370 A1 | 8/2018 | Kerler et al. | | |

FOREIGN PATENT DOCUMENTS

| | | |
|---|---|---|
| DE | 102009054458 | 6/2011 |
| DE | 102015011709 | 3/2016 |
| GB | 2560735 | 9/2018 |
| JP | 3622861 | 2/2005 |
| JP | 1711765 | 6/2011 |
| JP | 5252987 | 7/2013 |
| WO | 2008070064 | 6/2008 |
| WO | 2018065505 | 4/2018 |

* cited by examiner

SUSPENSION HAVING ELECTRICALLY-CONTROLLABLE MATERIAL

CROSS-REFERENCE TO RELATED APPLICATIONS

This application claims priority to and the benefit of U.S. provisional application No. 62/798,616, filed on Jan. 30, 2019; U.S. provisional application No. 62/798,632, filed on Jan. 30, 2019; and U.S. provisional application No. 62/804,431, filed on Feb. 12, 2019. The disclosures of the above applications are incorporated herein by reference.

FIELD

The present disclosure relates to a vehicle suspension system and more particularly, to a suspension system that is dynamically adjusted.

BACKGROUND

The statements in this section merely provide background information related to the present disclosure and may not constitute prior art.

In a typical vehicle, shock absorbers are used in combination with springs to reduce the effect of bumps in the road, thereby providing improved ride quality and vehicle handling. Shock absorbers are utilized in combination with suspension springs so that the shock absorber dampens the spring oscillations. Common shock absorbers use hydraulic fluid and/or pneumatic chambers along with valving to absorb excess energy from the springs.

Similarly, many drivers and passengers have a preference for their vehicle ride experience. A sportier ride generally includes a stiffer suspension and ride feel while a luxury ride generally includes a softer suspension and ride feel. Presently, a vehicle suspension can be adjusted to provide the vehicle suspension with a sportier or luxury feel, which is generally controlled by a driver using an interface/button/knob.

Further, cargo is often shipped by truck, train, airplanes and ships. Cargo units are employed that can be moved from one type of shipping vehicle to another. In addition, cargo units are sometimes integrally formed on a bed of a truck or train car or on a trailer to be pulled by a truck. A vast array of products are transported in a cargo unit, which are similarly protected to at least some degree from bumps in the road by shock absorbers. However, these shock absorbers, and other shock absorbers for the vehicle suspension have limited and discrete adjustability and do not accommodate a variety of road conditions or continuously changing road conditions.

These issues related to the adjustability of shock absorbers, among other issues related to noise, vibration, and harshness (NVH) in motor vehicles, are addressed by the present disclosure.

SUMMARY

This section provides a general summary of the disclosure, and is not a comprehensive disclosure of its full scope or all of its features.

According to one form of the present disclosure, a vehicle load-bearing member includes an electro-active material, a lead wire for delivering an electric current to the electro-active material, and a controller in communication with a power supply for supplying electric current to the electro-active material for changing the dynamic characteristics of the electro-active material, wherein changing the dynamic characteristics of the electro-active material changes at least one of dampening and stiffness of the vehicle load-bearing member by changing the shape of the electro-active material.

According to a variation, the vehicle load-bearing member includes a suspension arm and a wheel supported by the suspension arm, and the electro-active material is configured to control the suspension arm. In further variation, the suspension arm includes an elastomeric material. In a further still variation, the electro-active material is embedded within the elastomeric material. In a yet further still variation, the controller receives signals from a sensor detecting motion of the elastomeric material and provides an electric current to the electro-active material to change the shape of the electro-active material. In yet another variation, the controller receives a direct or indirect request to change the dynamic characteristics of the elastomeric material and provides an electric current to the electro-active material in response to the direct or indirect request.

According to another variation, the vehicle load-bearing member includes a vehicle seat wherein the electro-active material is disposed proximate a frame of the vehicle seat. In another such variation, the frame of the vehicle seat comprises an elastomeric material, and the electro-active material is disposed adjacent to the elastomeric material. In a further such variation, the controller receives a direct or indirect request to change the dynamic characteristics of the elastomeric material and provides an electric current to the electro-active material in response to the direct or indirect request.

In a further variation, the vehicle load-bearing member includes a cargo unit, and the electro-active material is proximate the cargo unit. In other further variations, the cargo unit includes a cargo floor, and the cargo floor includes an elastomeric material and the electro-active material is disposed adjacent to the elastomeric material. In other further such variations, the controller receives signals from a sensor detecting motion of the elastomeric material and provides an electric current to the electro-active material to change the size or shape of the electro-active material. In a further such variation, the controller receives a direct or indirect request to change the dynamic characteristics of the elastomeric material and provides an electric current to the electro-active material in response to the direct or indirect request.

According to another form, a method for controlling at least one of dampening and stiffness of a vehicle suspension system includes applying an electric current to an electro-active material in the vehicle suspension system in response to a direct or indirect request to change at least one of the dampening and stiffness of the vehicle suspension system, wherein applying the electric current changes the shape of the electro-active material.

According to a variation, the electro-active material controls a suspension arm, and the suspension arm supports a wheel. In another variation, the suspension arm comprises an elastomeric material and the electro-active material is disposed adjacent to the elastomeric material.

In another variation, the electro-active material is disposed proximate a vehicle seat. In other such variations, a frame of the vehicle seat comprises an elastomeric material, and the electro-active material is disposed adjacent to the elastomeric material.

In a further variation, the electro-active material is proximate a cargo unit. In other such variations, the cargo unit includes a cargo floor and comprises an elastomeric material, and the electro-active material is disposed adjacent to the elastomeric material.

Further areas of applicability will become apparent from the description provided herein. The description and specific examples in this summary are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
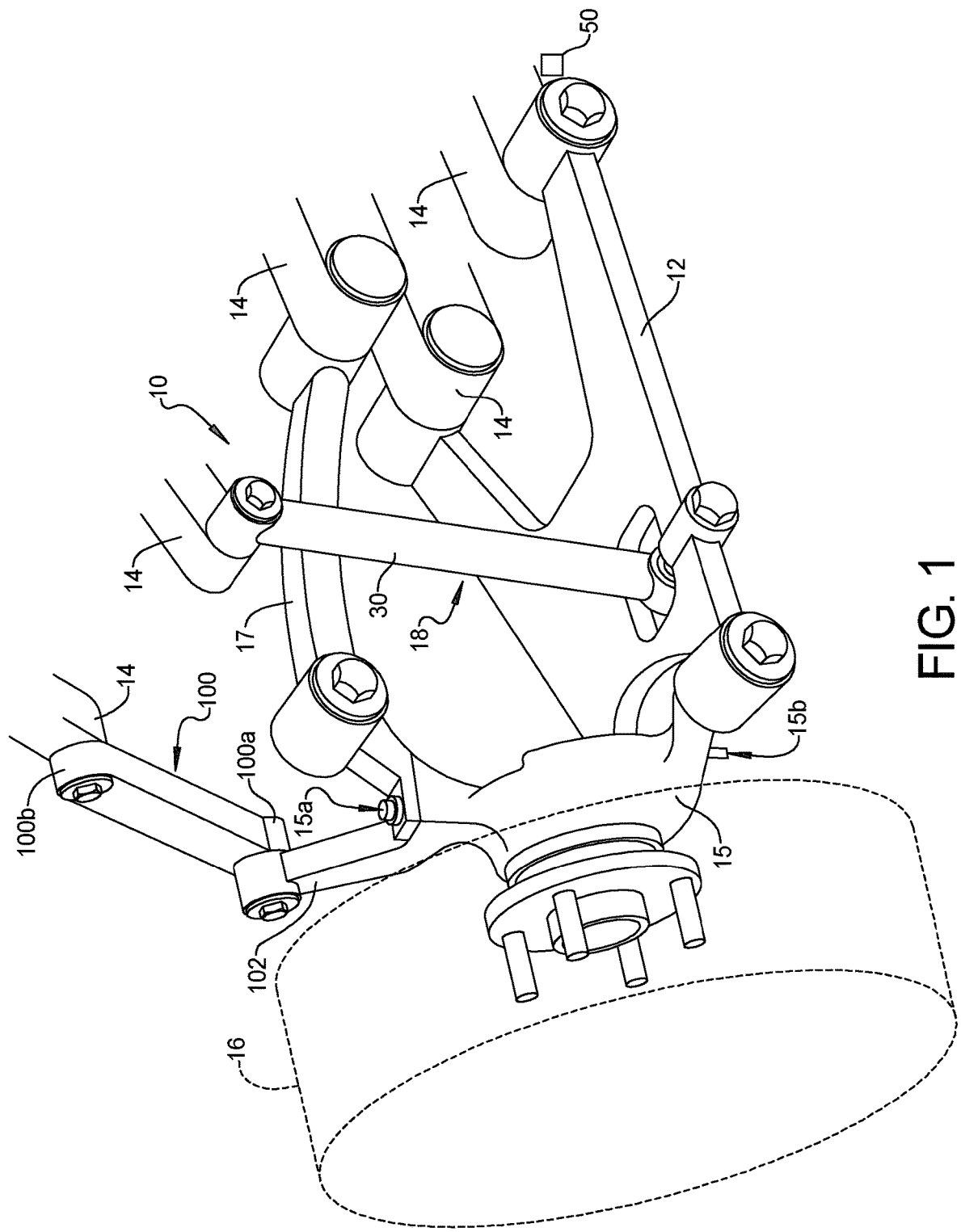
FIG. 1 is a perspective view of a vehicle suspension system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1 a vehicle suspension system 10 is shown including a suspension arm 12 adapted to be pivotally mounted to a vehicle body or frame 14. A steering knuckle 15 and a wheel 16 are supported by the suspension arm 12. The steering knuckle 15 is pivotally mounted to the suspension arm 12 and an upper suspension arm 17 by upper and lower pivots 15a, 15b. A spring/damper mechanism 18 can be connected directly or indirectly to the suspension arm 12 and to the vehicle body or frame 14, only parts of which are shown.

Figure 2:
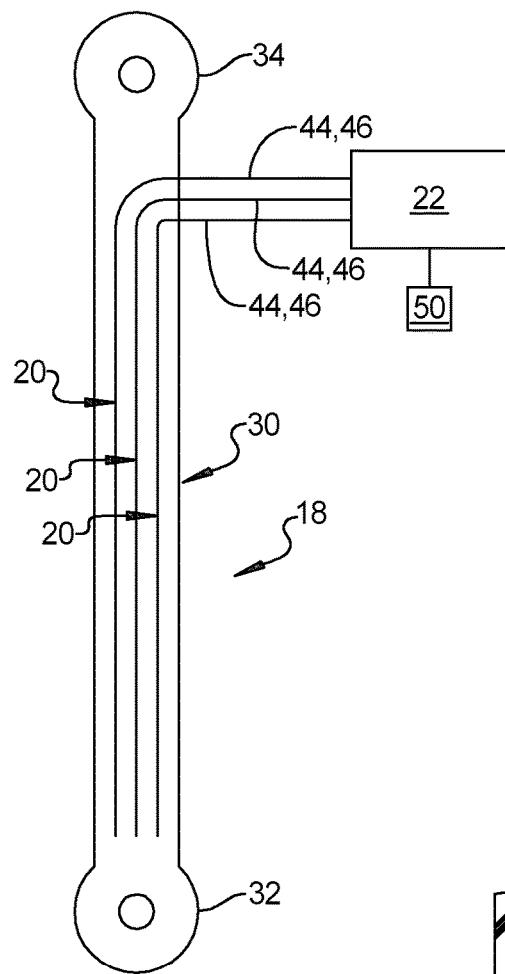
FIG. 2 is a schematic view of an elastomeric spring/damper mechanism with an electro-active polymer in an un-activated state.

Referring to FIG. 2, the spring/damper mechanism 18 includes an electro-active material, such as an electro-active polymer, 20 embedded within an elastomeric body 30 to control movement of the suspension arm 12. Generally, a controller 22 supplies an electric field/electric current to the electro-active polymer 20 for changing dynamic characteristics of the electro-active polymer 20 within the spring/damper mechanism 18 as described in greater detail below. Further, the spring/damper mechanism 18 can take on various forms as illustrated and described herein, each including the electro-active polymer 20 disposed therein. The spring/damper mechanism 18 may also be referred to herein as "elastomeric spring/dampers" relative to other applications, which are described in greater detail below.

The controller 22 is in communication with a power supply (not shown) for supplying electric current to the electro-active polymer 20 for changing dynamic characteristics of the electro-active polymer 20. Changing dynamic characteristics of the electro-active polymer 20 changes at least one of dampening and stiffness of a vehicle load-bearing member (such as the spring/damper mechanism 18) by changing the shape of the electro-active polymer 20.

The elastomeric body 30 is connected between the suspension arm 12 (not shown in FIG. 2) and the vehicle body or frame 14 (not shown in FIG. 2). The exemplary elastomeric body 30 is shown including a first end fitting 32 for connecting to the suspension arm 12 and a second end fitting 34 for connecting to the vehicle body or frame 14. The elastomeric body 30 further includes the electro-active polymer 20 that exhibits a change in size or shape when stimulated by an electric field. The electro-active polymer 20 can be in a form of strips or films that are embedded or otherwise disposed within or on (either directly or indirectly) the elastomeric body 30. For example, a contraction of electro-active polymer strips embedded within the elastomeric body 30 can restrict the elastic response of the elastomeric body 30 to external loads. Accordingly, the "electro-active polymer 20" is also referred to herein as electro-active polymer strips or films 20.

The elastomeric body 30 can include rubber materials, silicone or other known elastomeric materials, including structural reinforcements to form a composite material, and combinations thereof. The elastomeric body 30 can further include hollow regions, apertures, exterior ribbing or other geometric features (not shown) therein that provide a desired flexibility and or rigidity to the elastomeric body 30. In addition, the elastomeric body 30 can include inserts (not shown) to strengthen or reinforce the elastomeric body 30.

As is understood in the art, electro-active polymers mimic an artificial muscle-like behavior under an applied voltage or electric field. In particular, the materials can reversibly expand or contract in response to a voltage or current. In addition, the materials have a large power-to-weight ratio compared with traditional rigid actuators. Currently known electro-active polymers include piezoelectric polymers, dielectric actuators (DEAs), electrostrictive graft elastomers, liquid crystal elastomers (LCE) and ferroelectric polymers. However, it should be understood that the teachings of the present disclosure are not limited to these specific materials and instead include all electro-active polymers that function according to the teachings herein.

Figure 3:
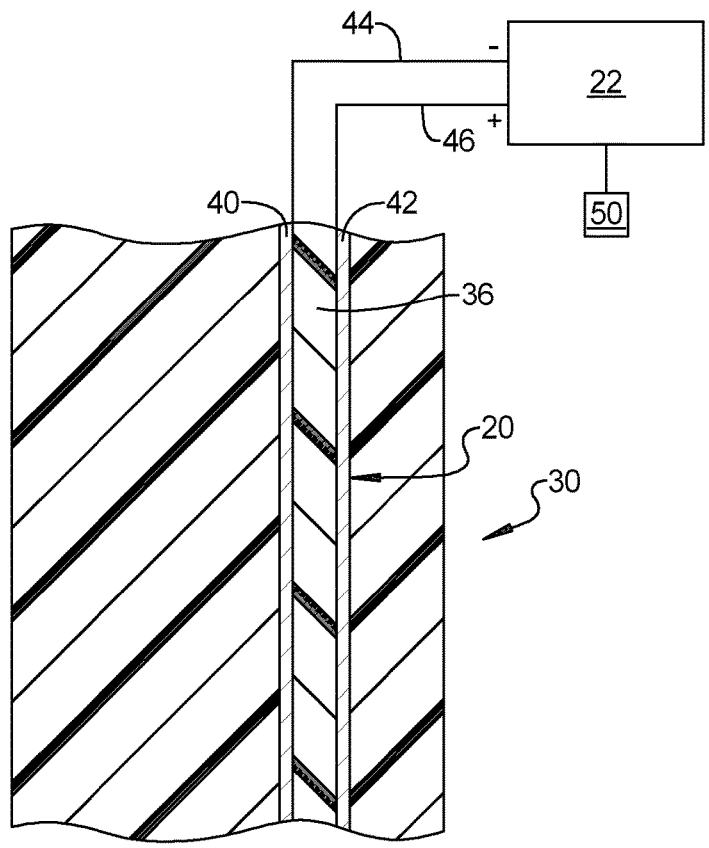
FIG. 3 is an enlarged partial cross-sectional view of an elastomeric electro-active polymer in an un-activated state.

As shown in the partial cross-sectional view of FIG. 3, the electro-active polymer 20 in the form of strips includes an elongated strip of electro-active polymer 36 which is provided with a pair of conductive electrodes 40, 42 applied to a surface thereof. When no electric field is applied via the electrodes 40, 42, the cations in the electro-active polymer material are randomly oriented. When an electric field is applied to the electrodes 40, 42, the cations gather to the side of the elongated strip of electro-active polymer 36 in contact with the anode (−) electrode 40 which causes the elongated strip of electro-active polymer 36 to bend or twist depending upon the shape and orientation of the electrodes and the electro-active polymer 20. In particular, if the electrodes 40, 42 are arranged in a non-symmetric configuration, or in positions relative to each other that are not symmetric (e.g., one electrode 40 is straight up and down, and the other electrode 42 is at an angle relative to the other electrode), the imposed voltage can induce a variety of deformations such as torsion, bending, compression/contraction, tension/extension, whether symmetric or non-symmetric about various parts of the elastomeric body 30, among others. These types of electro-active polymer materials exhibit deformation as a function of the applied electric input. By way of not limiting example, these types of electro-active polymer materials could exhibit up to 0.5" deflection under 12V. By way of further not-limiting example, these types of electro-active polymer materials could exhibit up to 1" deflection under 14V.

Although the number of electro-active polymer strips or films 20 shown in the cross sectional view of FIG. 2 is three (3), it should be understood that any number of strips or films 20 can be utilized to provide the desired range of dampening characteristics while remaining within the scope of the present disclosure.

The electro-active polymer strips or films 20 are selectively supplied with an electric field by electric contacts 44, 46 (also referred to as "lead wires" herein) that can be respectively connected to the electrodes 40, 42 on opposite sides of the electro-active polymer strips or films 20. As a voltage is applied to the electro-active polymer strips or films 20, the change in size of the electro-active polymer strips or films 20 is utilized to limit the flexibility of the elastomeric body 30 when they are reduced in size and/or changed in shape and allows greater flexibility when the electro-active polymer strips or films 20 are enlarged/relaxed.

Accordingly, by applying or removing an electric field to the electro-active polymer strips or film 20, the characteristics of the elastomeric body 30 can be changed. By applying varying electric fields, or a variable current or voltage, via the controller 22 to the electro-active polymer strips or films 20, the stiffness of the suspension system can be adjusted depending upon the desired suspension stiffness. In addition, the suspension system 10 can be dynamically controlled by the controller 22 during vehicle operation to respond to dynamic inputs to the suspension system 10 while the wheels hit bumps in the roads (i.e., indirect requests to control the suspension system 10) or in response to a user request (i.e., direct requests to control the suspension system 10). In particular, as the suspension arm 12 responds to road inputs, the movement of the suspension arm 12 can be detected by a position sensor 50 and the electro-active polymer strips 36 can be controlled by the controller 22 to stiffen the elastomeric body 30 to change the spring and damper effect of the elastomeric body 30 to resist and slow down the movement of the suspension arm 12.

The controller 22 can be utilized to activate all or a select number of the electro-active polymer strips or films 20 to vary the flexibility characteristics of the elastomeric body 30 over a range of flexibility characteristics. As all of the electro-active polymer strips or films 20 are activated and deformed by application of a voltage, the elastic response of the elastomeric body 30 can be more reduced. As smaller subsets of select numbers of the electro-active polymer strips or films 20 are activated and deformed by application of a voltage, the elastic response of the elastomeric body 30 can be increased.

The controller 22 can be connected to each of the elastomeric bodies 30 of the four vehicle corner suspension systems and apply a voltage to varying numbers of electro-active polymer strips 20 or films 36 to provide a desired level of elastomeric characteristics.

Figure 4:
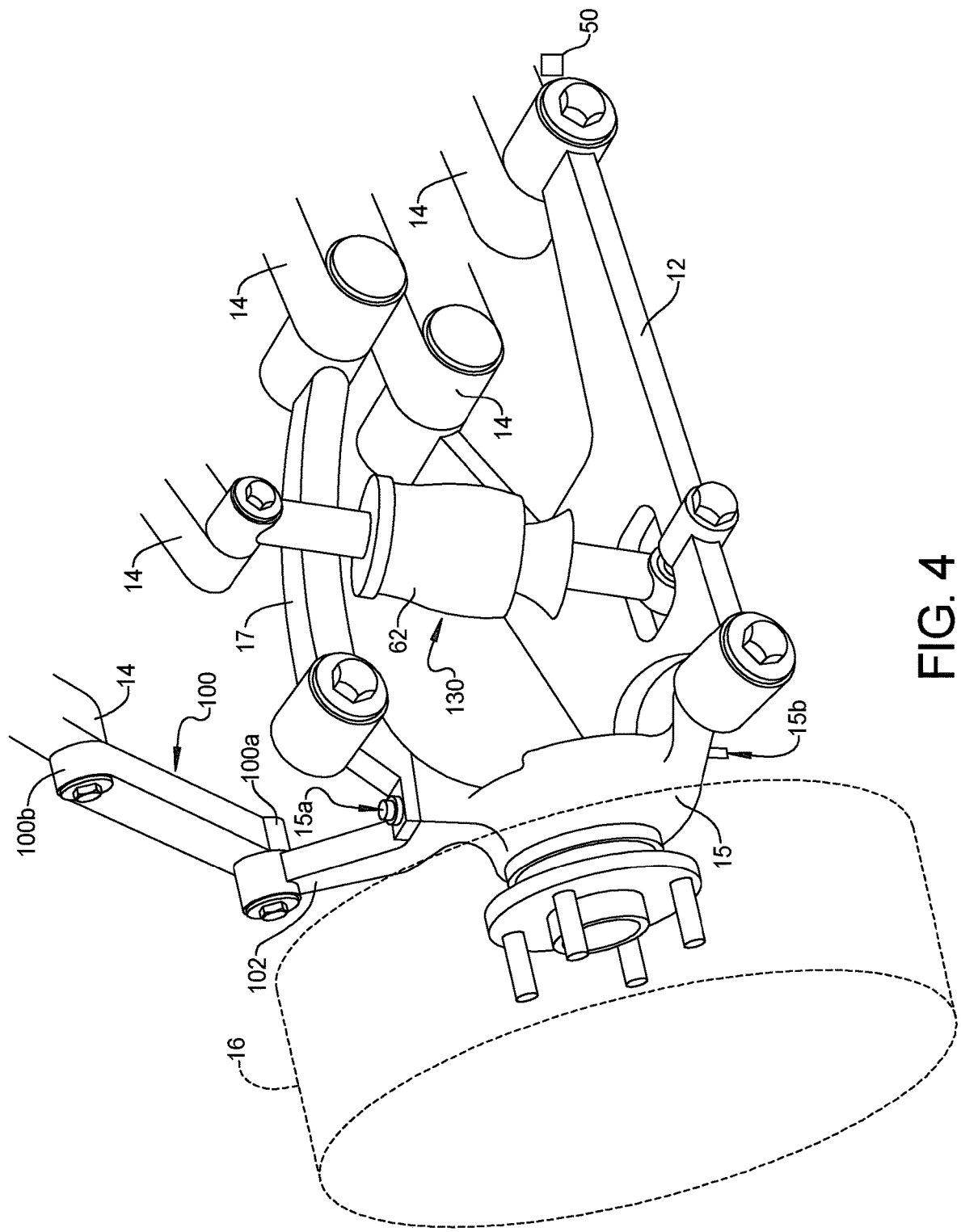
FIG. 4 is a perspective view of a vehicle suspension system having a rolling lobe air spring/damper mechanism with an electro-active polymer.
Figure 5:
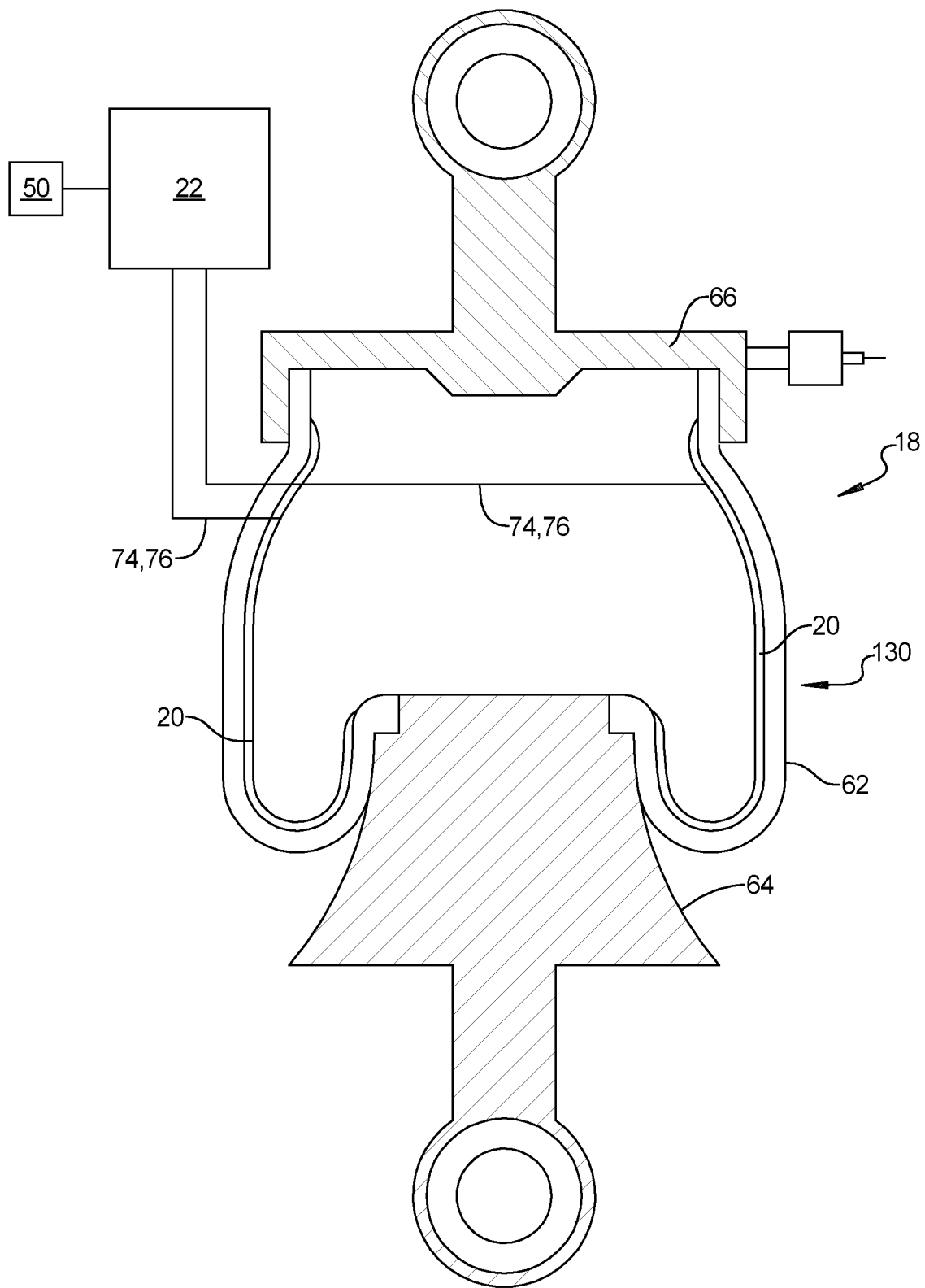
FIG. 5 is a schematic view of a rolling lobe air spring/damper mechanism with an electro-active polymer.

Referring now to FIGS. 4 and 5, an alternate form of the present disclosure includes a rolling lobe air spring 130 that includes electro-active polymer strips 20 incorporated in the cylindrical boot 62 of rubber or rubber like material. The rolling lobe air spring 130 is filled with air and the cylindrical boot 62 defines a rolling lobe along the piston 64. The cylindrical boot 62 is clamped to the piston 64 at a first end and connected to an upper connecting part 66 at a second end, as is generally known in the art. The cylindrical boot 62 includes electro-active polymer strips 20 incorporated therein between layers of rubber or rubber like material.

Figure 6:
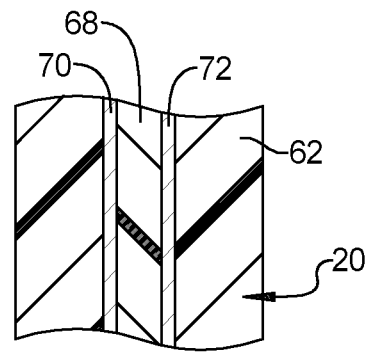
FIG. 6 is a partial cross-sectional view of the rolling lobe air spring with an electro-active polymer therein.

As shown in FIG. 6, the electro-active polymer strips 20 include an elongated strip of electro-active polymer 68 is provided with a pair of metal electrodes 70, 72 applied to a surface thereof. When no electric field is applied via the electrodes 70, 72 the cations in the electro-active polymer strips 20 are randomly oriented. When an electric field is applied to the electrodes 70, 72, the cations gather to the side of the electro-active polymer strip 20 in contact with the anode (−) electrode 70, which causes the electro-active polymer strip 20 to bend or twist depending upon the shape and orientation of the electrodes and the electro-active polymer 68. In particular, if the electrodes 70, 72 are arranged in a non-symmetric configuration, the imposed voltage can induce a variety of deformations such as torsion, bending, compression/contraction, tension/extension, whether symmetric or non-symmetric about various parts of the elastomeric body 30, among others. These types of electro-active polymer materials 68 exhibit deformation as a function of the applied electric input, similar to that set forth above.

Although the number of electro-active polymer strips or films 20 shown in the cross sectional view of FIG. 5 is two (2), it should be understood that any number of strips or films 20 can be utilized to provide the desired range of dampening characteristics while remaining within the scope of the present disclosure.

The electro-active polymer strips or films 20 are selectively supplied with an electric field by electric contacts 74, 76 connected to the controller 22 that can be respectively connected to the electrodes 70, 72 on opposite sides of the electro-active polymer strips or films 20. As a voltage is applied to the electro-active polymer strips or films 20, the change in size of the electro-active polymer strips or films 20 is utilized to limit the flexibility of the cylindrical boot 62 when it is reduced in size and/or changed in shape and allows greater flexibility when the electro-active polymer strips or films 20 are enlarged/relaxed.

Accordingly, by applying or removing an electric field to the electro-active polymer strips or film 20, the characteristics of the cylindrical boot 62 can be changed. By applying varying electric fields via the controller 22 to the electro-active polymer strips or films 20, the stiffness of the suspension system can be adjusted depending upon the desired suspension stiffness. In addition, the suspension system 10 can be dynamically controlled by the controller 22 during vehicle operation to respond to dynamic inputs to the suspension system 10 while the wheels hit bumps in the roads. In particular, as the suspension arm 12 responds to road inputs, the movement of the suspension arm 12 can be detected by a sensor 50 and the electro-active polymer strips 20 can be controlled by the controller 22 to stiffen the cylindrical boot 62 to change the spring and damper effect of the cylindrical boot 62.

The controller 22 can be utilized to activate all or a select number of the electro-active polymer strips or films 20 to vary the flexibility characteristics of the cylindrical boot 62 over a range of flexibility characteristics. As all of the electro-active polymer strips or films 20 are activated and deformed by application of a voltage, the elastic response of the cylindrical boot 62 can be most reduced. As smaller subsets of select numbers of the electro-active polymer strips or films 20 are activated and deformed by application of a voltage, the elastic response of the cylindrical boot 62 can be increased.

The controller 22 can be connected to each of the cylindrical boot 62 and apply a voltage to varying numbers of electro-active polymer strips or films 20 to provide a desired level of elastomeric characteristics.

Figure 7:
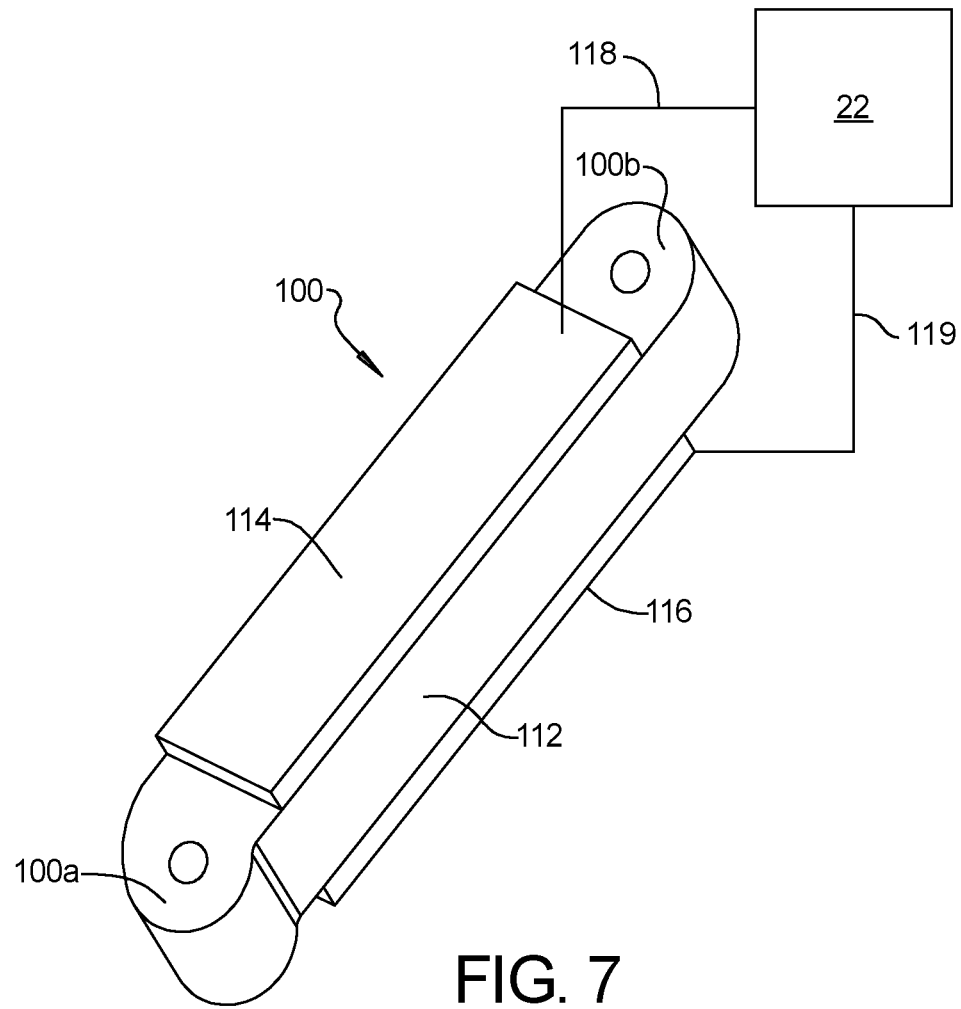
FIG. 7 is a perspective view of a steering actuator with an electro-active polymer.

Referring back to FIG. 1 and also to FIG. 7, a steering actuator 100 is shown attached to the steering knuckle 15 for steering the steering knuckle 15 and the wheel 16 mounted to the steering knuckle 15. The vehicle suspension system 10 can be of any known form. The steering actuator 100 includes a first end fitting 100a connected to an arm 102 of the steering knuckle 15 and a second end fitting 100b connected to the vehicle body or frame 14. The steering actuator 100 includes an electro-active polymer (not shown) to control movement of the steering knuckle 15. The controller 22 supplies an electric field to the electro-active polymer for changing a position of the steering knuckle 15.

The electro-active polymer can include an electro-active polymer strip 112 which is provided with a pair of metal electrodes 114, 116 applied to opposite surfaces thereof. When no electric field is applied via the electrodes 114, 116 the cations in the electro-active polymer material are randomly oriented. When an electric field is applied to the electrodes 114, 116, the cations gather to the side of the polymer in contact with the anode (−) electrode 114 which causes the polymer to bend or twist depending upon the shape and orientation of the electrodes and the electro-active polymer and the strength of the electric filed. In particular, if the plated electrodes 114, 116 are arranged in a non-symmetric configuration, the imposed voltage can induce a variety of deformations such as torsion, bending, compression/contraction, tension/extension, whether symmetric or non-symmetric about various parts of the elastomeric body 30, among others. These types of electro-active polymer materials exhibit deformation as a function of the applied electric input, as set forth above.

The electro-active polymer strip 112 is selectively supplied with an electric field by electric contacts 118, 119 that can be respectively connected to the electrodes 114, 116 on opposite sides of the electro-active polymer strip 112. As a voltage is applied to the electro-active polymer strip 112, the change in size of the electro-active polymer strip 112 is utilized to turn the steering knuckle 15.

Accordingly, by applying varying electric fields via the controller 22 to the electro-active polymer strip 112, the steering knuckle 15 can be electronically steered. The controller 22 can be part of an autonomous vehicle control system that steers the vehicle automatically. Alternatively, the controller 22 can be responsive to input from a driver or operator.

Figure 8:
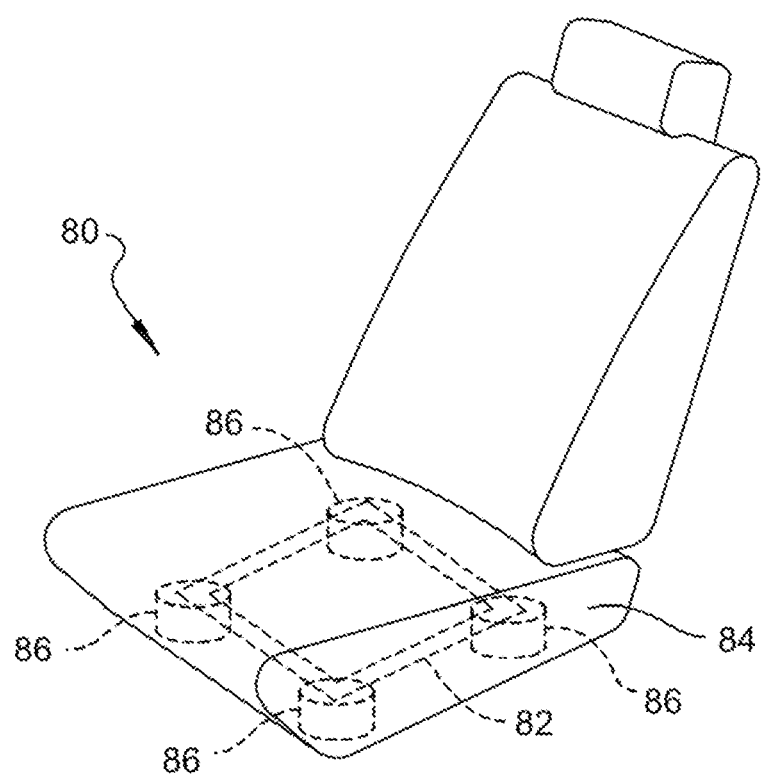
FIG. 8 is a perspective view of a vehicle seat having an adjustable spring/damper system.

Referring now to FIG. 8, the teachings of the present disclosure may also be applied to a vehicle seat 80. The vehicle seat 80 includes a frame 82 and a cushion 84 disposed on the frame. The frame 82 is supported by a plurality of elastomeric spring/dampers 86 that include an electrically controlled material to alter the elastomeric characteristics of the elastomer damper. Four elastomeric spring/dampers 86 are shown supporting the seat frame 82 in FIG. 1. However, it should be understood that any number or configuration of elastomeric spring/dampers 86 can be used for supporting the frame 82.

Figure 9:
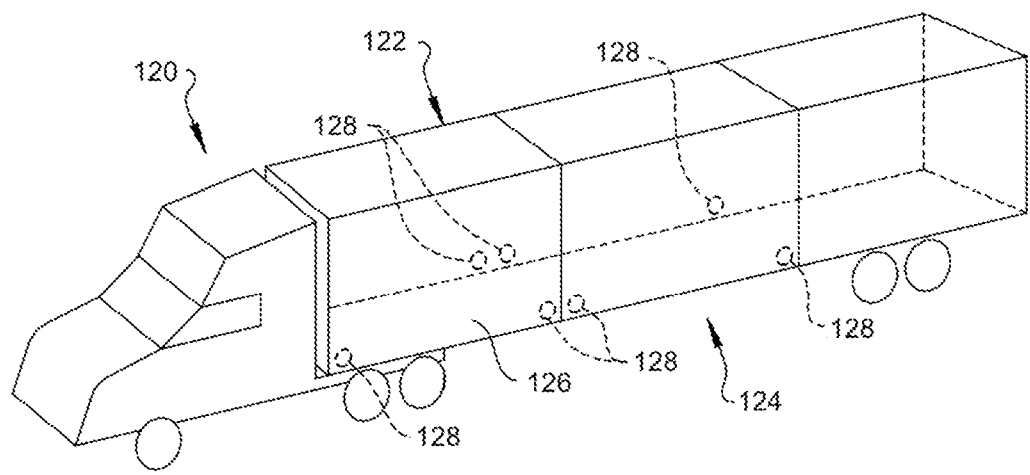
FIG. 9 is a perspective view of a cargo truck having a cargo unit.

Also referring to FIG. 9, the teachings of the present disclosure may further be applied to a truck 120 having a cargo unit 122 disposed on a trailer 124. The cargo unit 122 can be integrally formed with the trailer 124, formed as a separate cargo unit loaded on the trailer or formed on a bed of a truck 120. The cargo unit 122 includes a cargo floor 126 on which the cargo is loaded. The cargo unit 122 is supported by a plurality of elastomeric spring/dampers 128 that include an electrically controlled material to alter the elastomeric characteristics of the elastomeric spring/damper according to the teachings herein. Although four (4) elastomeric spring/dampers 128 are shown in the cargo unit 122, it should be understood that any number of elastomeric spring/dampers 128 can be used at spaced locations supporting the cargo unit floor 126 while remaining within the scope of the present disclosure.

Figure 10:
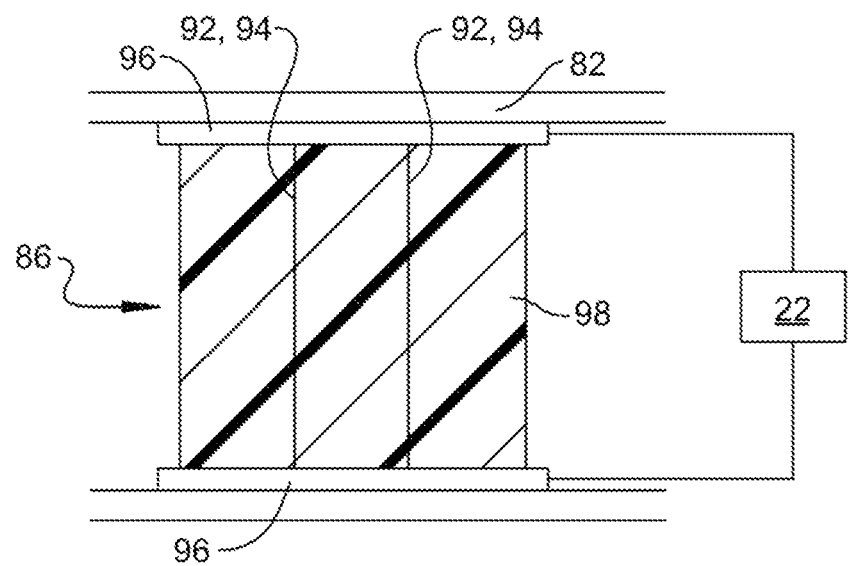
FIG. 10 is a schematic view of an elastomeric spring/damper including an electro-active polymer in an extended state providing a softer dampening.
Figure 11:
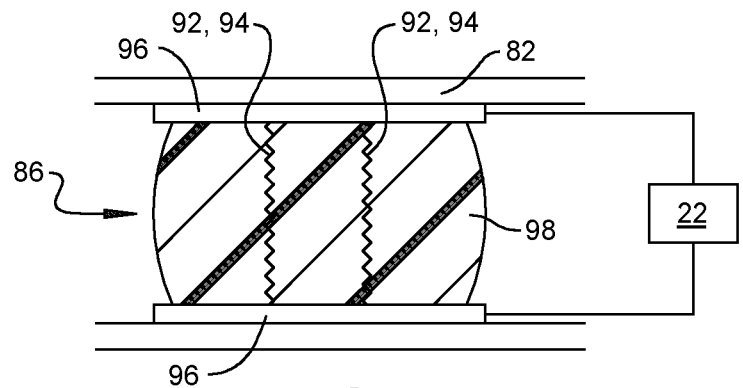
FIG. 11 is a schematic view of an elastomeric spring/damper including an electro-active polymer in a retracted state providing a more rigid dampening.

With reference to FIGS. 10 and 11 an exemplary elastomeric spring/damper 86 is shown including electro-active polymer that exhibits a change in size or shape when stimulated by an electric field. The electro-active polymer can be in a form of strips or films 92 that are embedded or otherwise disposed within an elastomeric material 94. The ends of the electro-active polymer strips 92 can be connected to upper and lower plates 96 (such as by an adhesive, clamping or other known attachment techniques) that can apply a compression force against the elastomeric material 98. In addition, a contraction of the electro-active polymer strips 92 embedded within the elastomeric material can restrict the elastic response of the elastomeric material without being physically connected to the upper and lower plates 96.

Similarly, the controller 22 can directly or indirectly change the characteristics of the stiffness of the seat suspension system or the cargo unit. By way of not-limiting example, by applying varying electric fields via the controller 22 to the electro-active polymer strips 36, the stiffness of the suspension system can be adjusted depending upon the fragile nature of the particular cargo being shipped in the cargo unit 122.

The elastomeric material 94 can include rubber materials, silicone or other known elastomeric materials and combinations thereof. The elastomeric dampers 86 (or elastomeric dampers 128) can include hollow regions, apertures, exterior ribbing or other geometric features therein that provide a desired flexibility to the elastomeric material 98.

As is understood in the art, electro-active polymers mimic an artificial muscle-like behavior under an applied voltage or electric field. In particular, the materials can reversibly expand or contract in response to a voltage or current. In addition, the materials have a large power-to-weight ratio compared with traditional rigid actuators. Currently known electro-active polymers include piezoelectric polymers, dielectric actuators (DEAs), electrostrictive graft elastomers, liquid crystal elastomers (LCE) and ferroelectric polymers.

Figure 12:
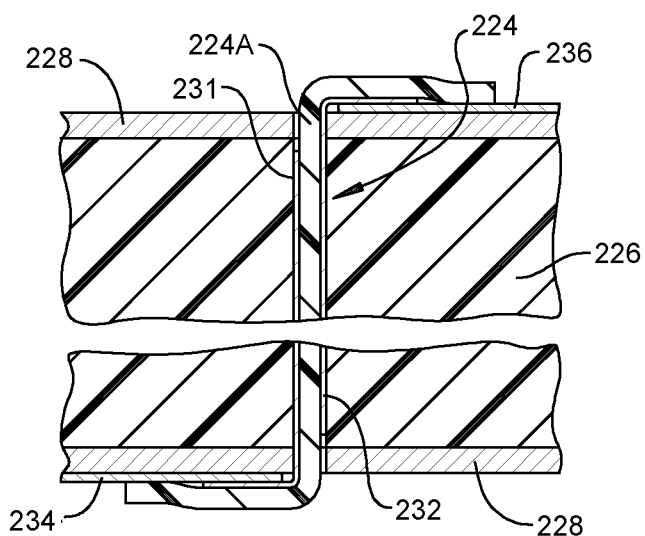
FIG. 12 is a schematic sectional view of an electro-active polymer strip disposed within an elastomeric damper.

As shown in FIG. 12, an elongated strip of electro-active polymer 224A is provided with metal electrodes 231, 232 applied to opposite surfaces thereof. When no electric field is applied via the electrodes 231, 232, the cations in the electro-active polymer material are randomly oriented. When an electric field is applied to the electrodes 231, 232, the cations gather to the side of the polymer in contact with the anode (−) electrode 231 which causes the polymer to bend or twist depending upon the shape and orientation of the electrodes and the electro-active polymer. In particular, if the plated electrodes 231, 232 are arranged in a non-symmetric configuration, the imposed voltage can induce a variety of deformations such as torsion, bending, compression/contraction, tension/extension, whether symmetric or non-symmetric about various parts of the elastomeric body 30, among others. These types of electro-active polymer materials exhibit deformation as a function of the applied electric input, as set forth above.

FIG. 10 shows the electro-active polymer strips or films 94 in an expanded state where the upper and lower plates 96 do not apply compressive forces on the elastomeric material 98 without limiting the elastic response of the elastomeric material.

FIG. 11 shows the electro-active polymer strips or films 94 in a contracted state so that the upper and lower plates can apply a compressive force on the elastomeric material 98 and the contracted electro-active polymer strips or films embedded within the elastomeric material 98 also can further limit the elastic response of the elastomeric material 98.

Although the number of electro-active polymer strips or films 94 shown in the cross sectional view of FIGS. 10 and 11 is two (2), it should be understood that any number of strips or films 94 can be utilized to provide the desired range of dampening characteristics while remaining within the scope of the present disclosure.

Turning back to FIG. 12, the electro-active polymer strips or films 224 are selectively supplied with an electric field by electric contacts 234, 236 that can be respectively connected to the electrodes 231, 232 on opposite sides of the electro-active polymer strips or films 224. As a voltage is applied to the electro-active polymer strips or films 224, the change in size of the electro-active polymer strips or films 224 is utilized to limit the flexibility of the elastomeric material 226 when it is reduced in size and/or changed in shape and allows greater flexibility when the electro-active polymer strips or films 224 are enlarged.

Accordingly, by applying or removing an electric field to the electro-active polymer strips or film 224, the characteristics of the elastomeric damper (such as elastomeric damper 86 or elastomeric damper 128) can be changed. By applying varying electric fields via the controller 22 to the electro-active polymer strips or films 224, the stiffness of the seat suspension system can be adjusted depending upon the individual passengers preferred ride feel.

The controller 22 can be utilized to activate all or a select number of the electro-active polymer strips or films 224 to vary the flexibility characteristics of the elastomeric material 226 over a range of flexibility characteristics. As all of the electro-active polymer strips or films 224 are activated and deformed by application of a voltage, the elastic response of the elastomeric material 226 can be most reduced. As smaller subsets of select numbers of the electro-active polymer strips or films 224 are activated and deformed by application of a voltage, the elastic response of the elastomeric material 226 can be increased.

The controller 22 can be connected to each of the elastomeric dampers and apply a voltage to varying numbers of electro-active polymer strips or films 224 to provide a desired level of elastomeric characteristics.

Although the electro-active materials as described herein are polymeric, it should be understood that other types of materials that react to an applied electrical voltage, or a proximate electrical field such as a magnetic field, may also be employed while remaining within the scope of the present disclosure. For example, shape memory alloys (SMAs) may also be employed in accordance with the teachings of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure. Furthermore, various omissions, substitutions, combinations, and changes in the forms of the systems, apparatuses, and methods described herein may be made without departing from the spirit and scope of the disclosure even if said omissions, substitutions, combinations, and changes are not explicitly described or illustrated in the figures of the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A vehicle suspension system comprising a vehicle load-bearing member comprising: an elastomeric body; a plurality of elastomeric-active strips embedded within the elastomeric body, each elastomeric-active strip contacting the elastomeric body along substantially an entire length of the elastomeric body; a lead wire for delivering an electric current to the elastomeric-active strips; and a controller in communication with a power supply for supplying electric current to the elastomeric-active strips for changing dynamic characteristics of the elastomeric-active strips, wherein changing dynamic characteristics of the elastomeric-active strips changes at least one of dampening and stiffness of the vehicle load-bearing member by changing the shape of the elastomeric-active strips.

2. The vehicle suspension system member of claim further comprising a suspension arm and a wheel supported by the suspension arm, wherein the elastomeric-active strips are configured to control the suspension arm.

3. The vehicle suspension system member of claim 2, wherein the suspension arm comprises the elastomeric body.

4. The vehicle suspension system member of claim 3, wherein the controller receives signals from a sensor detecting motion of the elastomeric body and provides an electric current to the elastomeric-active strips to change the shape of the elastomeric-active strips.

5. The vehicle suspension system member of claim 3, wherein the controller receives a direct or indirect request to change the dynamic characteristics of the elastomeric body and provides an electric current to the elastomeric-active strips in response to the direct or indirect request.

6. The vehicle suspension system member of claim 1 further comprising a vehicle seat wherein the elastomeric-active strips are disposed proximate a frame of the vehicle seat.

7. The vehicle suspension system member of claim 6, wherein the frame of the vehicle seat comprises the elastomeric body.

8. The vehicle suspension system member of claim 7, wherein the controller receives a direct or indirect request to change the dynamic characteristics of the elastomeric body and provides an electric current to the elastomeric-active strips in response to the direct or indirect request.

9. The vehicle suspension system member of claim 1 further comprising a cargo unit, wherein the elastomeric-active strips are proximate the cargo unit.

10. The vehicle suspension system member of claim 9, wherein the cargo unit includes a cargo floor, the cargo floor comprising the elastomeric body.

11. The vehicle suspension system member of claim 10, wherein the controller receives signals from a sensor detecting motion of the elastomeric body and provides an electric current to the elastomeric-active strips to change the size or shape of the elastomeric-active strips.

12. The vehicle suspension system member of claim 10, wherein the controller receives a direct or indirect request to change the dynamic characteristics of the elastomeric body and provides an electric current to the elastomeric-active strips in response to the direct or indirect request.

13. A method for controlling at least one of dampening and stiffness of a vehicle suspension system, the method comprising:
  applying an electric current to a plurality of elastomeric-active strips in the vehicle suspension system in response to a direct or indirect request to change at least one of dampening and stiffness of the vehicle suspension system, wherein applying the electric current changes the shape of the elastomeric-active strips, and wherein the elastomeric-active strips are embedded within an elastomeric body,
  wherein each elastomeric-active strip contacting the elastomeric body along substantially an entire length of the elastomeric body.

14. The method of claim 13, wherein the elastomeric-active strips control a suspension arm, wherein the suspension arm supports a wheel.

15. The method of claim 14, wherein the suspension arm comprises the elastomeric body.

16. The method of claim 13, wherein the elastomeric-active strips are disposed proximate a vehicle seat.

17. The method of claim 16, wherein a frame of the vehicle seat comprises the elastomeric body.

18. The method of claim 13, wherein the elastomeric-active strips are proximate a cargo unit.

19. The method of claim 18, wherein the cargo unit includes a cargo floor, the cargo floor comprising the elastomeric body.

* * * * *